May 5, 1942.  R. T. NEWTON  2,282,238
LAWN MOWER FOR GRASSES, GRAINS, AND THE LIKE
Filed Oct. 31, 1940   2 Sheets-Sheet 2
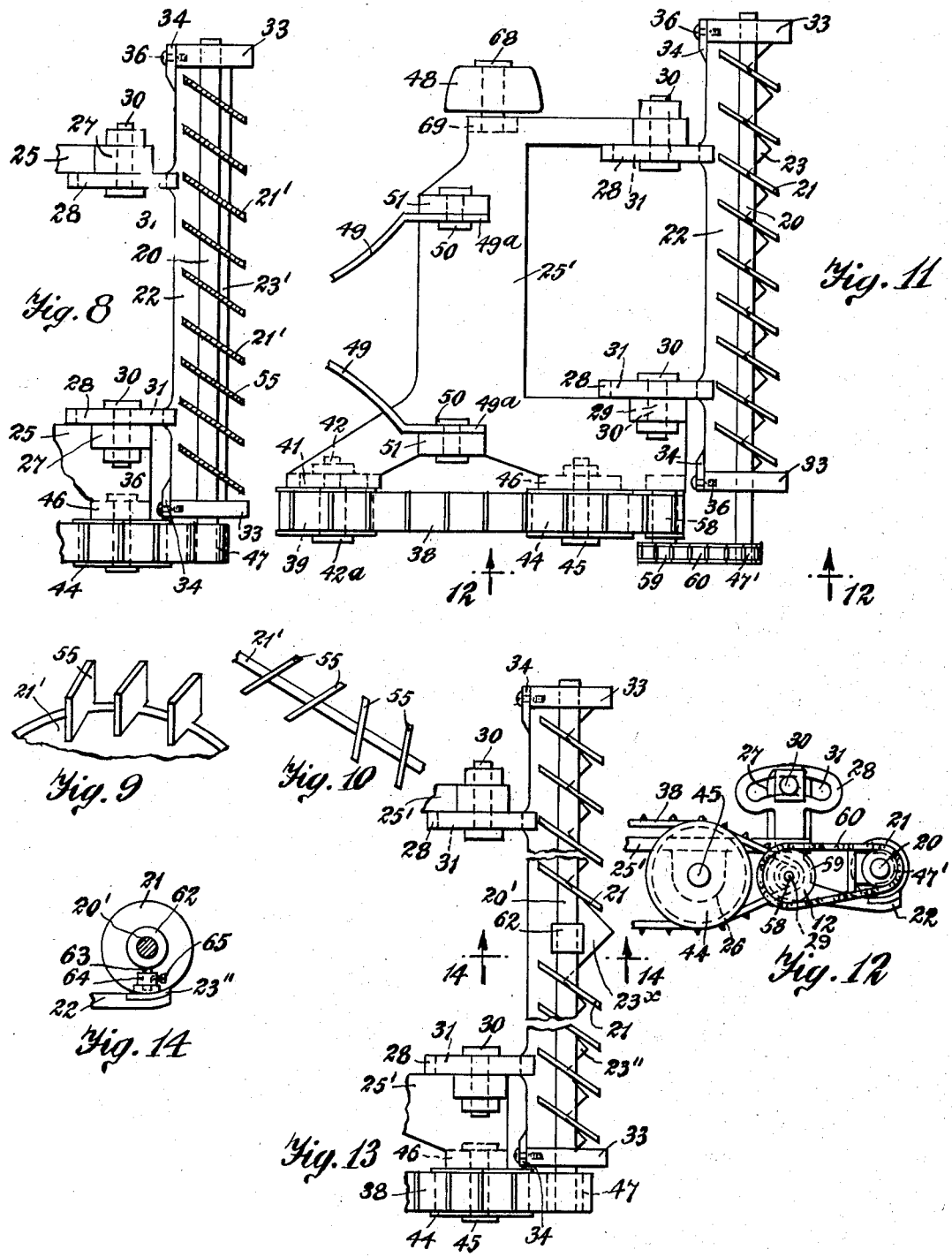
INVENTOR.
RICHARD T. NEWTON
BY
ATTORNEY.

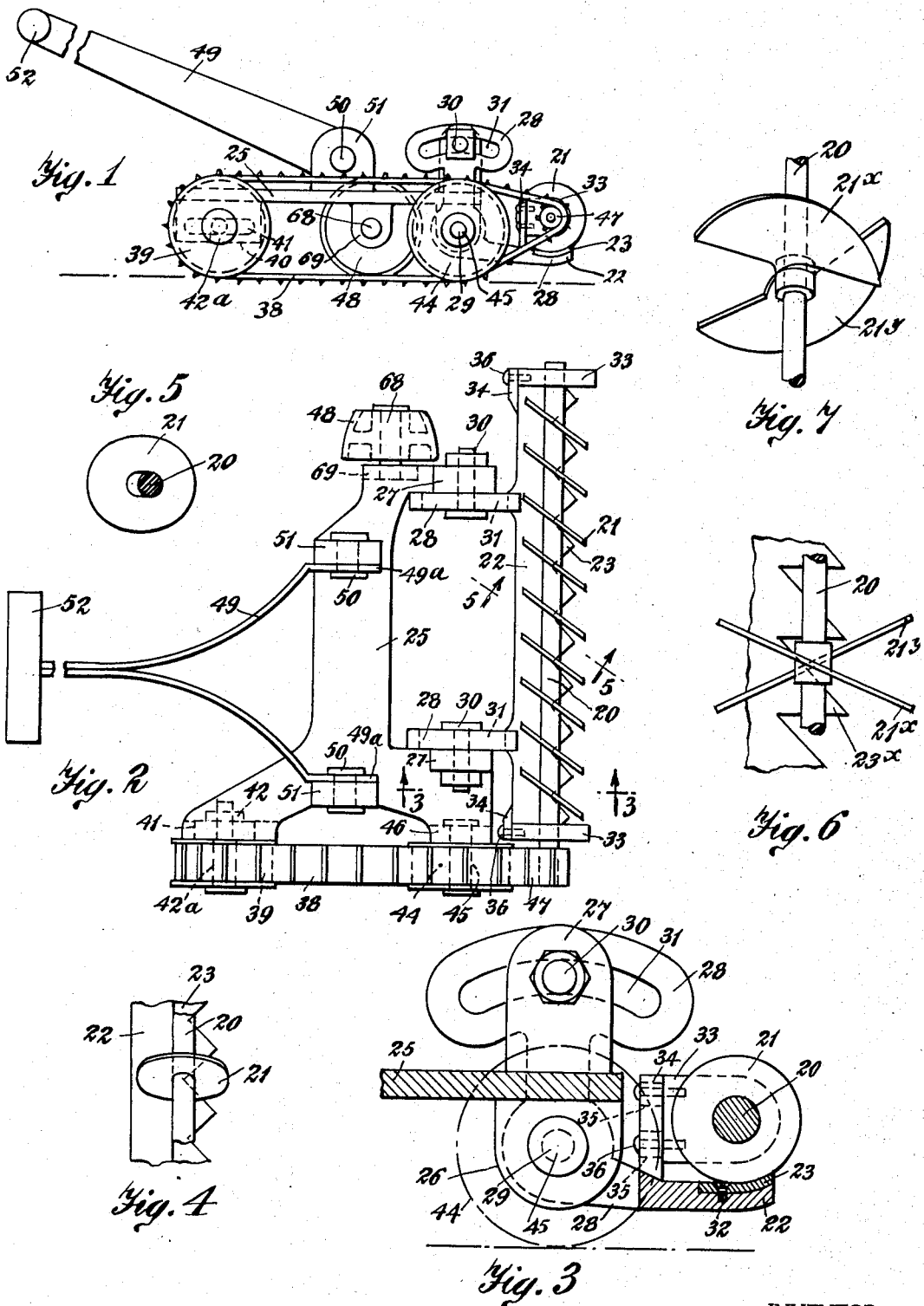

Patented May 5, 1942

2,282,238

UNITED STATES PATENT OFFICE 2,282,238

LAWN MOWER FOR GRASS, GRAINS, AND THE LIKE

Richard T. Newton, New York, N. Y.

Application October 31, 1940, Serial No. 363,635

12 Claims. (Cl. 56—252)

This invention relates to new and useful improvements in lawn mowers.

The dominant feature of the invention resides in a certain construction of the cutters, which, it is believed, will effectively cut grass, grains, and the like. It is believed that the construction proposed will cut both long and short grass and grains, distinguishing from present forms of lawn mowers which have a tendency to push long grass and grains away from the cutters instead of cutting these materials as intended. The new construction proposed will permit the blades of grass, or whatever is to be cut, to enter between the cutters and by a certain angled revolving action of the cutters, to be sheared off at an angle to the direction in which the cutters revolve. A construction is proposed whereby certain cutting actions will alternately take place, first towards the right and then towards the left to more effectively cut the blades of grass, grain, etc.

More specifically, the invention contemplates the provision of a revolving disc cutter with or without peripheral teeth coacting with a stationary bar cutter with or without teeth, depending upon the particular construction of these cutters so that the cutter peripheries maintain constant contact with the cutter bar and cut at approximately right angles to the direction in which the mower is moved, cutting as before explained laterally in one direction and then laterally in the other giving two cutting movements for each revolution of the cutters.

Still further the invention proposes a novel arrangement for relatively adjusting the disc cutters in relation to the bar cutter and proposes another means for relatively adjusting the bar cutter in relation to the ground to control the distance of the cut from the ground for more effectively controlling the cutting action of the lawn mower.

Moreover, the invention proposes to so construct the new cutters for the lawn mower that they may be driven by the same conventional means such as ground engaging wheels, or a motor, or mechanism common in present day mowers and operated in a similar fashion. However, this invention also teaches a new and simpler operator mechanism for the cutters in which the power is transmitted to the cutter shaft by an endless tractor belt which is supported by two or more free wheels provided with means to keep the tractor belt in position and which passes over a toothed wheel or sprocket on the cutter shaft. A simple and novel adjustment means is also provided to keep the tractor belt at proper tension. With this arrangement there is a large area of ground contact for driving the cutters. It is also proposed to provide anti-slipping studs or other forms of anti-slip projects on the outside of the belt. With this construction the tractor belt may be made of rubber-fabric, chain or interlocking metal stampings, etc.

The invention also contemplates a third supporting ground wheel to be positioned for a proper three point balance and to act to keep the cutter bar parallel to the ground. Another purpose for this wheel is to permit the mower to be tilted so that its weight may be moved on this wheel and free the tractor belt from contact with the ground. It is proposed that this wheel be rounded on its outer side to give a larger supporting surface when the mower is tilted. More than one wheel could be used for this same purpose if desired. This form of tractor drive permits the driving of the cutter shaft from one end instead of a two wheel drive to both ends of the shaft as on the conventional lawn mowers. The ability to move the mower forwards and rearwards without revolving the cutter eliminates all clutches and ratchets necessary on the conventional mower to accomplish this.

The invention also contemplates setting the cutter discs irregularly longitudinally, or spirally on the cutter shaft to divide the cutting effort.

Still further the invention contemplates a construction for speeding up the revolutions of the cutter shaft in relation to the ground footage.

An arrangement is also contemplated wherein the propelling effort for moving the mower forwards and rearwards is away from the longitudinal center of the mover towards the side of greater resistance, to wit, the tractor belt, so as to properly balance the propelling effort.

The invention also contemplates an arrangement to permit a center bearing to be provided for the cutter shaft adapting the new cutter arrangement for mowers of exceptional widths. It is proposed that a tooth on the cutter bar be widened to allow sufficient space between the disc cutters for a bearing. Means is provided for adjustably supporting this bearing to allow adjustment of the cutter shaft.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure—

Fig. 1 is a side elevational view of a lawn mower for grass, grains and the like constructed in accordance with this invention.

Fig. 2 is a plan view of Fig. 1.

Fig. 3 is a fragmentary enlarged vertical sectional view taken on the line 3—3 of Fig. 2.

Fig. 4 is a fragmentary plan view of a portion of the cutter shown in Fig. 2 but illustrated in a turned position.

Fig. 5 is a fragmentary vertical sectional view of the disc cutter taken on the line 5—5 of Fig. 2, and specifically showing the shape of one of the disc cutters.

Fig. 6 is a fragmentary plan view of a modified form of cutter for the lawn mower.

Fig. 7 is a fragmentary perspective view of the disc cutter shown in Fig. 6.

Fig. 8 is a fragmentary plan view similar to Fig. 2 but illustrating a modified form of the invention.

Fig. 9 is a fragmentary perspective view of one of the cutters shown in Fig. 8.

Fig. 10 is a fragmentary plan view of one of the cutters shown in Fig. 8.

Fig. 11 is a plan view of a lawn mower constructed in accordance with another form of this invention.

Fig. 12 is a fragmentary side elevational view looking in the direction of the line 12—12 of Fig. 11.

Fig. 13 is a fragmentary plan view of a lawn mower constructed according to another form of this invention.

Fig. 14 is a fragmentary vertical sectional view taken on the line 14—14 of Fig. 13.

The lawn mower, in accordance with this invention, includes a revolving horizontal shaft 20 arranged transversely of the direction of motion of the mower. A plurality of disc shaped cutters 21 are mounted on the shaft 20 at spaced positions and at angular positions in relation to the axis of the shaft. A stationary cutter bar support 22 is disposed beneath the cutters 21 and extends parallel to the shaft 20. A plurality of cooperative cutting elements are arranged on the disc cutters 21 and on the cutter bar support 22 to cut grass, grains and the like at approximately right angles to the direction in which the mower is moving, with the cutting action first taking place in one lateral direction, then in the other. In the particular form of the invention illustrated in Figs. 1-5 inclusive these cooperative cutting elements comprise a toothed bar 23 mounted upon the said stationary cutter bar 22. The teeth of this bar 23 are cooperative with smooth peripheral edges of the disc cutters 21.

Each disc cutter 21 is of substantially elliptical form, as clearly shown in Fig. 5 so as to be capable of reaching laterally in each direction for cooperating in a certain way with the teeth of the bar 23. During each complete revolution of the disc cutter 21, one half of its periphery to one side of its major axis will sweep laterally in one direction, and the other half to the other side of the major axis will sweep laterally in the other direction. The cutter peripheries maintain constant contact with the cutter bar during this operation. The disc cutter may rotate clockwise or counter-clockwise and operate satisfactorily, depending merely upon design of the teeth thereof. The teeth of the cutter bar may be larger or smaller depending on design so that each disc cutter travels along a tooth or a group of the teeth during its cutting action.

Attention is called to the fact that each disc cutter is always cutting at approximately right angles to the direction in which the mower moves during the cutting operation. The cutting operation is continuous through the major portion of each rotation of each cutter. Cutting takes place at all times, except when the points on the cutting edges of the cutters which lay on the major axes pass the complementary cutter. The complementary cutter, that is the bar 23, is located forwards of the axis of the shaft 20 which supports the elliptical cutters 21. With this arrangement the cutters 21 will tend to first divide the grass and grains being cut into groups and then cut the grass and grains of these groups without tending to bend the grass and grains forwards during the cutting operation. While the specific disc cutters and cooperative bar cutter may be driven with conventional lawn mower drive means, a new design of operating mechanism having numerous advantages over the prior constructions is proposed and will now be described in detail.

The lawn mower, in accordance with this invention, includes a horizontal frame 25. The bar cutter 23 is mounted on the bar cutter support 22 which in turn is mounted in a certain manner on the front of said frame. The frame 25 is provided with a pair of downwardly projecting lugs 26 and with another pair of upwardly projecting lugs 27. The cutter support 22 is provided with a pair of arms 28 extending along the inner faces of the lugs 26 and 27. Pintles 29 are engaged through adjacent lugs 26 and the arms 28 for pivotally supporting the said cutter bar support 22. Fastening elements such as bolts and nuts 30 are mounted upon the lugs 27 and engage through arcuate slots 31 which are concentric with the pivots 29. The bolts 30 are capable of clamping the material adjacent the edges of the slots 31 for holding the arms 28 in various fixed positions. The bar cutter 23 is of a tough quality steel and is mounted upon the front portion of the cutter support 22 with fastening elements 32.

The shaft 20 is supported in a pair of spaced bearing blocks 33 which are vertically adjustably mounted on vertically extending lugs 34 projecting from the cutter bar support 22. More specifically, the lugs 34 are formed with vertical slots 35 (see Fig. 3). Fastening elements 36 engage through these slots and threadedly engage the blocks 33 for fixedly holding the blocks. The arrangement is such that the fastening elements 36 may be loosened and the blocks 33 may be shifted upwards or downwards to adjust the relative positions of the disc cutters 21 in relation to the bar cutter 23. Changes in the angular position of the arms 28 control the elevational of the cutters 21 and 23 in relation to the ground. This controls the height at which the cutting action takes place.

A traction belt 38 is mounted on one side of the frame 25 and is for the purpose of driving the shaft 20. More specifically, the traction belt 38 engages over a wheel 39 which is longitudinally adjustably mounted on the frame 25. The frame 25 is provided with a downwardly extending lug 40 having a horizontal slot 41. A fastening element 42 engages through the slot 41 and is adapted to be fixed in various positions along the slot. This fastening element has a stud portion 42a comprising the axle for the wheel 39. The traction belt 38 engages over another wheel 44 which is disposed to the front of the wheel 39 in line with it. This wheel 44 is supported on an axle 45 which is fixedly mounted on a lug 46 projecting from the frame 25. The traction belt 38 engages over a pinion 47 in line with the wheels 39 and 44 and to the front of the wheel 44 and mounted on the end of the shaft 20. The arrangement is such that when the frame 25 is pushed along the ground the traction belt 38 will move, rotating the pinion 47 which rotates the shaft 20.

The frame 25 is provided with a ground engaging wheel 48 on the side remote from the traction belt 38. The wheel 48 is mounted on an axle 68 supported on a lug 69 depending from the frame 25. This ground engaging wheel 48 forms a three point support for the frame 25. The wheel 48 has a curved outer periphery, as illustrated in Fig. 2, for facilitating tipping upwards of the near side of the lawn mower so as to disengage the tractor belt 38 from the ground. A handle 49 is mounted on the rear of the frame 25, off center towards the traction belt 38. The handle 49 has a pair of side portions 49a which are pivotally connected by pintles 50 with spaced lugs 51 projecting from the frame 25. The handle 49 extends rearwards, and its rear end is provided with a grip portion 52. This grip portion is disposed laterally of the handle to facilitate a twisting motion by which the lawn mower may be tilted on the ground engaging wheel 48 for lifting the tractor belt 38 off the ground. The ground engaging wheel 48 also functions in cooperation with the wheels 39 and 44 for supporting the cutter bar parallel with the ground during the cutting action.

Attention is called to the fact that the handle 49 is offset towards the tractor belt 38 in order to balance the lawn mower during its operation. The tractor belt side is much heavier than the other side which only has the small ground engaging wheel 48. The offset arrangement of the handle 49 compensates for the unbalanced condition of the side portions of the mower. The correct location for the handle is along the longitudinal center of gravity of the mower.

Attention is also called to the fact that the remote end of the bar cutter support 22 projects further laterally than the ground engaging wheel 48. Consequently, when the mower is tilted on the wheel 48 it must be tilted but a small amount sufficient to disengage the tractor belt 38 from the ground. The projecting end of the bar cutter support 22 acts as a stop to prevent too much tilting. With this limitation the operation of the lawn mower will require a minimum of effort.

In Figs. 6 and 7 a modified form of cutter for use in the mower has been disclosed. In accordance with this form each disc cutter is formed from a pair of semi-elliptical sections 21x and 21y. These sections are set at an angle to each other. Each of these sections comprises one-half of an elliptical shape divided on its major axis. The sections 21x and 21y are mounted upon the shaft 20 which is superimposed above the toothed bar 23x.

The operation of this cutter is substantially identical to the prior form. During one half of a complete rotation of the shaft 20 the cutter section 21y will continually engage the cutter bar 23x and during the remaining half of a complete revolution the cutter section 21x will continually engage the cutter bar 23x. However, the cutting actions of the sections 21x and 21y will be in the same lateral directions, for example, the section 21y will sweep towards the left and the section 21x will sweep towards the left.

In Figs. 8–10 inclusive a modified form of the invention is disclosed which is similar to the prior form distinguishing merely in the cooperative cutting elements of the disc cutters and on the bar cutter. In accordance with this form of the invention the bar cutter support 22 is provided with a bar cutter 23' having a straight cutting edge as distinguished from the teeth on the front edge of the cutter in the prior form. However, the disc cutters 21' are provided with teeth 55 cooperative with the straight edge of the bar cutter 23'. The disc cutters 21' are mounted upon the shaft 20 in angular positions identically the same as the corresponding cutters in the prior form of the invention. However, the teeth 55 are arranged at an angle which will produce a shearing action in conjunction with the straight edge of the bar cutter 23'. The disc cutters 21' are also of elliptical shape, similar to the shape shown in Fig. 5. The teeth 55 are arranged in two directions so as to get the cutting action in laterally opposite directions in a way similar to the operation of the prior form of the invention.

More specifically, the teeth 55 along one half of the periphery of the cutter 21', to one side of the major axis, are inclined in one direction as schematically shown in Fig. 10, and the teeth on the other half of the periphery to the other side of the major axis are inclined in the other direction, also as shown in Fig. 10. With this arrangement the disc cutter 21' may turn from its zero position corresponding with the zero position shown in Fig. 8 to its 180° position, and during this action the cutting will take place laterally in one direction. Thereafter during the remaining 180° of rotation of the cutter the cutting action will take place in the other direction because of the inclination of the cutting teeth 55 as just described.

In other respects this form of the invention is identical to the previous form and like parts are identified by like reference numerals.

In Figs. 11 and 12 another modified form of the invention has been disclosed which distinguishes from the forms of the invention illustrated in Figs. 1–10 in the fact that a step-up system has been provided for driving the shaft 20. In accordance with this form of the invention the lawn mower includes a frame 25' which is somewhat longer than the frame 25 and which supports an auxiliary wheel or sprocket 58 which is coaxial with the pivot 29 and which is driven by the traction belt 38. This wheel or sprocket 58 is connected with a wheel or sprocket 59 engaged by a chain or belt or other driving element 60 which engages the wheel or sprocket 47' on the shaft 20. With this arrangement when the lawn mower is being operated there will be a step-up in the speed at which the shaft 20 rotates.

In other respects this form of the invention is similar to the previous forms and like parts are identified by like reference numerals.

In Figs. 13 and 14 still another form of the invention has been disclosed which is very similar to the first form, distinguishing merely in the fact that an arrangement has been provided for supporting the shaft 20' at an intermediate point. This construction is particularly valuable for lawn mowers of more than average width. With the additional support the tendency for the shaft 20' to flex will be reduced or completely eliminated. In this arrangement the cutter bar 23'' is provided with a wide central tooth 23x.

The disc cutters 21 are arranged to the sides of this extra wide and large tooth 23x and operate only along a portion of the sides thereof. This leaves an unmolested central area in which a support bearing 62 is mounted. The support bearing 62 encircles the shaft 20' and has a support stem 63 extending downwards into a socket 64 which is mounted on the cutter bar 23''. A set screw 65 engages the socket 64 and clamps the support 63 in a fixed position. With this arrangement the screw 65 may be loosened and the support 63 adjusted upwards or downwards as may be required when the relative positions of the cutters 21 are adjusted in relation to the cutter bar 23''.

In other respects this form of the invention is similar to the previous forms and like parts are identified by like reference numerals.

It is advisable that the disc cutters be spaced at equal distances from each other but in turned positions on the operator shaft in spiral formation to uniformly distribute the cutting action throughout the width of the lawn mower.

The operation of a lawn mower, in accordance with this invention, is as follows:

The lawn mower is rested on the ground so that the tractor belt 38 engages the ground and the frame of the mower is supported by the ground engaging wheel 48 also resting on the ground. The mower is pushed with the hands engaging the grip portions 52. It is pushed forwards. This causes the tractor belt 38 to move, driving the shaft 20. The blades of grass, grain or other similar material being cut, will engage in between the cutters of the mower and be cut. The cutting action is at approximately right angles to the direction of motion of the mower, first acting laterally in one direction and then in the other as previously explained.

When the mower is to be moved rearwards it is advisable that the grip portion 52 be given a slight torque to tilt the mower slightly upon the ground engaging wheel 48 so that the tractor belt 38 disengages from the ground. It may now be drawn rearwards without the shaft 20 being driven in reverse. However, if the mower is drawn rearwards without first tilting it, there will be no damage to any of the parts.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new and desire to secure by United States Letters Patent is:

1. In a lawn mower for grass, grains and the like, having a revolving horizontal shaft transversely of the direction of motion of the mower, a plurality of elliptical shaped cutters mounted on said shaft at spaced positions and at angular positions in relation to the axis of said shaft, a stationary bar cutter beneath said cutters and extending parallel to and forwards of the axis of said shaft, and cooperative cutting elements on said elliptical cutters and bar cutter whereby when said lawn mower is moved forwards said elliptical shaped cutter will separate the grass, grains and the like to be cut into groups and then cut said grass, grains and the like without bending same materially and cutting approximately at right angles to the direction in which the mower is moving with the cutting being continuous during the major portion of the rotation of said cutters and the cutting action first taking place in one lateral direction and then in the other.

2. In a lawn mower for grass, grains and the like, having a revolving horizontal shaft transversely of the direction of motion of the mower, a plurality of elliptical shaped cutters mounted on said shaft at spaced positions and at angular positions in relation to the axis of said shaft, a stationary bar cutter beneath said cutters and extending parallel to and forwards of the axis of said shaft, and cooperative cutting elements on said elliptical cutters and bar cutter whereby when said lawn mower is moved forwards said elliptical shaped cutter will separate the grass, grains and the like to be cut into groups and then cut said grass, grains and the like without bending same materially and cutting approximately at right angles to the direction in which the mower is moving with the cutting being continuous during the major portion of the rotation of said cutters and the cutting action first taking place in one lateral direction and then in the other, said cooperative elements comprising teeth on the cutter bar cooperative with smooth cutting edges on said elliptical shaped cutters.

3. In a lawn mower for grass, grains and the like, having a revolving horizontal shaft transversely of the direction of motion of the mower, a plurality of elliptical shaped cutters mounted on said shaft at spaced positions and at angular positions in relation to the axis of said shaft, a stationary bar cutter beneath said cutters and extending parallel to and forwards of the axis of said shaft, and cooperative cutting elements on said elliptical cutters and bar cutter whereby when said lawn mower is moved forwards said elliptical shaped cutter will separate the grass, grains and the like to be cut into groups and then cut said grass, grains and the like without bending same materially and cutting approximately at right angles to the direction in which the mower is moving with the cutting being continuous during the major portion of the rotation of said cutters and the cutting action first taking place in one lateral direction and then in the other, said cooperative cutting elements comprising teeth on the peripheries of the elliptical shaped cutters cooperative with a straight edge cutting bar.

4. In a lawn mower for grass, grains and the like, having a revolving horizontal shaft transversely of the direction of motion of the mower, a plurality of elliptical shaped cutters mounted on said shaft at spaced positions and at angular positions in relation to the axis of said shaft, a stationary bar cutter beneath said cutters extending parallel to and forwards of the axis of said shaft, and cooperative cutting elements on said elliptical cutters and bar cutter whereby when said lawn mower is moved forwards said elliptical shaped cutter will separate the grass, grains and the like to be cut into groups and then cut said grass, grains and the like without bending same materially and cutting approximately at right angles to the direction in which the mower is moving with the cutting being continuous during the major portion of the rotation of said cutters and the cutting action first taking place in one lateral direction and then in the other, said cooperative cutting elements comprising teeth on the peripheries of the elliptical shaped cutters cooperative with a straight edge cutting bar, said elliptical shaped cutters having each half thereof to the sides of the major axis inclined in opposite directions.

5. A mower and the like, comprising a horizontal frame, a bar cutter support mounted on the front of said frame, a bar cutter mounted on said support, a shaft mounted on said support above and parallel to said bar cutter, a complementary cutter mounted on said shaft, a traction belt mounted on one side of said frame and driving said shaft, a handle mounted on the rear of said frame off center towards said traction belt, and a ground engaging wheel mounted on the other side of said frame.

6. A mower and the like, comprising a horizontal frame, a bar cutter support mounted on the front of said frame, a bar cutter mounted on said support, a shaft mounted on said support above and parallel to said bar cutter, a complementary cutter mounted on said shaft, a traction belt mounted on one side of said frame and driving said shaft, a handle mounted on the rear of said frame off center towards said traction belt, and a ground engaging wheel mounted on the other side of said frame, said bar cutter being adjustably mounted to control its distance from the ground.

7. A mower and the like, comprising a horizontal frame, a bar cutter support mounted on the front of said frame, a bar cutter mounted on said support, a shaft mounted on said support above and parallel to said bar cutter, a complementary cutter mounted on said shaft, a traction belt mounted on one side of said frame and driving said shaft, a handle mounted on the rear of said frame off center towards said traction belt, and a ground engaging wheel mounted on the other side of said frame, said bar cutter support being pivotally mounted on said frame, and means for holding said support in various pivoted positions to control the distance of the bar cutter from the ground.

8. A mower and the like, comprising a horizontal frame, a bar cutter support mounted on the front of said frame, a bar cutter mounted on said support, a shaft mounted on said support above and parallel to said bar cutter, a complementary cutter mounted on said shaft, a traction belt mounted on one side of said frame and driving said shaft, a handle mounted on the rear of said frame off center towards said traction belt, and a ground engaging wheel mounted on the other side of said frame, said complementary cutters comprising a plurality of disc shaped cutters mounted on said shaft at spaced positions and at angular positions in relation to the axis of the shaft, and a stationary bar cutter beneath said disc shaped cutters and extending parallel to the shaft and cooperative cutting elements on said disc cutters and bar cutter to cut grass, grains and the like approximately at right angles to the direction in which the mower is moving with the cutting action first taking place first in one lateral direction and then in the other.

9. A mower and the like, comprising a horizontal frame, a bar cutter support mounted on the front of said frame, a bar cutter mounted on said support, a shaft mounted on said support above and parallel to said bar cutter, a complementary cutter mounted on said shaft, a traction belt mounted on one side of said frame and driving said shaft, a handle mounted on the rear of said frame offcenter towards said traction belt, a ground engaging wheel mounted on the other side of said frame, a pair of spaced guide wheels adjustably mounted on one side of said frame and comprising the support of said traction belt.

10. A mower or the like, comprising a horizontal frame, a bar cutter support mounted on the front of said frame, a bar cutter mounted on said support, a shaft mounted on said support above and parallel to said bar cutter, a complementary cutter mounted on said shaft, a traction belt mounted on one side of said frame and driving said shaft, a handle mounted on the rear of said frame offcenter towards said traction belt, and a ground engaging wheel mounted on the other side of said frame, and having a curved periphery to facilitate pivoting of the mower on this wheel to lift the traction belt off the ground.

11. A mower and the like, comprising a horizontal frame, a bar cutter support mounted on the front of said frame, a bar cutter mounted on said support, a shaft mounted on said support above and parallel to said bar cutter, a complementary cutter mounted on said shaft, a traction belt mounted on one side of said frame and driving said shaft, a handle mounted on the rear of said frame offcenter towards said traction belt, and a ground engaging wheel mounted on the other side of said frame, and having a curved periphery to facilitate pivoting of the mower on this wheel to lift the traction belt off the ground, said handle being disposed along the longitudinal center of gravity of the mower.

12. A mower and the like, comprising a horizontal frame, a bar cutter support mounted on the front of said frame, a bar cutter mounted on said support, a shaft mounted on said support above and parallel to said bar cutter, a complementary cutter mounted on said shaft, a traction belt mounted on one side of said frame and driving said shaft, a handle mounted on the rear of said frame offcenter towards said traction belt, a ground engaging wheel mounted on the other side of said frame, and a speed step-up device for driving said shaft at a greater rate of speed than the linear speed of said belt.

RICHARD T. NEWTON.